(12) United States Patent
Chan

(10) Patent No.: US 7,577,068 B2
(45) Date of Patent: Aug. 18, 2009

(54) DYNAMIC WRITE STRATEGY MODIFICATION METHOD AND APPARATUS

(75) Inventor: Yu-Min Chan, Dasi Township, Taoyuan County (TW)

(73) Assignee: Mediatek Inc., Hsin-Chu (TW)

( * ) Notice: Subject to any disclaimer, the term of this patent is extended or adjusted under 35 U.S.C. 154(b) by 696 days.

(21) Appl. No.: 11/379,070

(22) Filed: Apr. 18, 2006

(65) Prior Publication Data

US 2007/0242584 A1 Oct. 18, 2007

(51) Int. Cl.
*G11B 5/09* (2006.01)

(52) U.S. Cl. .................. 369/47.53; 369/47.5; 369/53.1; 369/116

(58) Field of Classification Search ........................ None
See application file for complete search history.

(56) References Cited

U.S. PATENT DOCUMENTS

| | | | |
|---|---|---|---|
| 2003/0035355 A1* | 2/2003 | Morishima | 369/47.53 |
| 2004/0100885 A1 | 5/2004 | Nakamura | |
| 2004/0160873 A1* | 8/2004 | Pereira | 369/47.53 |
| 2004/0160874 A1 | 8/2004 | Hwang et al. | 369/47.53 |
| 2004/0264330 A1* | 12/2004 | Roh | 369/47.53 |

FOREIGN PATENT DOCUMENTS

| | | |
|---|---|---|
| CN | 1503258 | 6/2004 |
| EP | 1416477 A2 | 5/2004 |

OTHER PUBLICATIONS

Official Communication of its corresponding China patent application issued on Aug. 8, 2008.

* cited by examiner

*Primary Examiner*—Muhammad N. Edun
(74) *Attorney, Agent, or Firm*—Thomas, Kayden, Horstemeyer & Risley

(57) ABSTRACT

The invention relates to write strategy modification, and in particular, to dynamic write strategy modification. A dynamic write strategy modification method comprises: writing a plurality of data on to an optical disk according to a writing strategy with at least three parameters; measuring at least two quality indices of the data wrote on the optical disk; storing a result comprising the parameters and the corresponding quality indices; judging whether a terminate condition is achieved; if no, changing the parameters and repeating the above steps; if yes, analyzing the stored results and outputting an optimal writing strategy with at least three optimal parameters.

21 Claims, 6 Drawing Sheets

DYNAMIC WRITE STRATEGY MODIFICATION METHOD AND APPARATUS

BACKGROUND

The invention relates to write strategy modification, and in particular, to dynamic write strategy modification.

A write strategy for recording data on a disc comprises a plurality of parameters such as back-end pulse interval, front-end pulse ratio, back-end pulse ratio. These parameters, however, are not always optimal. Please refer to FIG. 1A, FIG. 1B, and FIG. 1C. FIG. 1A, FIG. 1B, and FIG. 1C show various pits recorded on a disc with various write strategy parameter values. Pits recorded on a disc are respectively short, long, and shift in FIG. 1A, FIG. 1B, and FIG. 1C with non-optimal write strategy parameters. These non-optimal write strategy parameters result in poor recording quality.

SUMMARY

An object of the invention is to provide a dynamic write strategy modification method. Firstly, writing a plurality of data on to an optical disk according to a writing strategy with at least three parameters and measuring at least two quality indices of the data wrote on the optical disk, then storing a result comprising the parameters and the corresponding quality indices. After that, judging whether a terminate condition is achieved; if no, changing the parameters and repeating the above steps; if yes, analyzing the stored results and outputting an optimal writing strategy with at least three optimal parameters.

A further object of the invention is to provide a dynamic write strategy modification apparatus. The dynamic write strategy modification apparatus comprises a pick-up head, an RF signal processing circuit, an adjusting control circuit, and a result processing unit. The pick-up writes a plurality of data on to an optical disk according to a writing strategy with at least three parameters. The RF signal processing circuit measures at least two quality indices of the data wrote on the optical disk. The adjusting control circuit stores a result comprising the parameters and the corresponding quality indices, judges whether a terminate condition is achieved, changes the parameters to generating a next write strategy and transmitting the next write strategy to the PUH if the terminate condition is not achieved, and sends the results if the terminate condition is achieved. The result processing unit receives the results from the adjusting control circuit, analyzes the stored results, and outputs an optimal writing strategy with at least three optimal parameters according to the analyzing.

DESCRIPTION OF THE DRAWINGS

The following detailed description, given by way of example and not intended to limit the invention solely to the embodiments described herein, will best be understood in conjunction with the accompanying drawings, in which.

DESCRIPTION

Figure 1A:
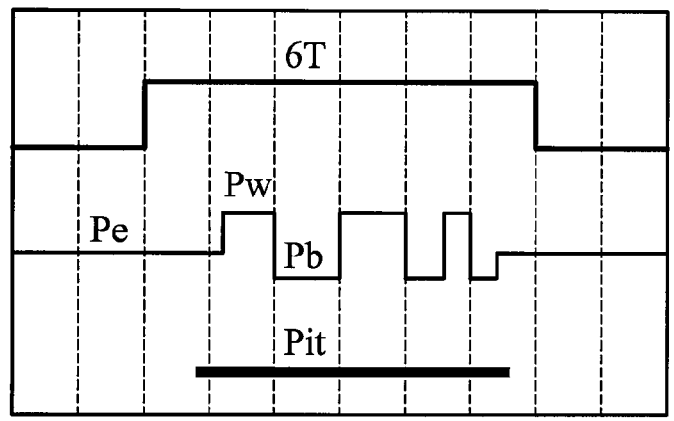
FIG. 1A, FIG. 1B, and FIG. 1C show various pits recorded on a disc with various values of non-optimal parameters.
Figure 1B:
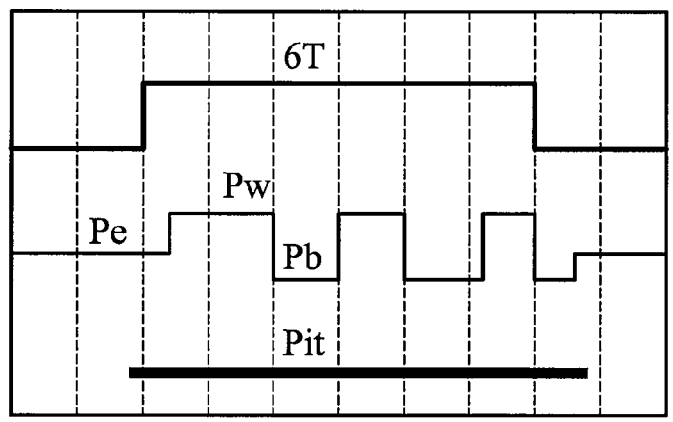
Figure 1C:
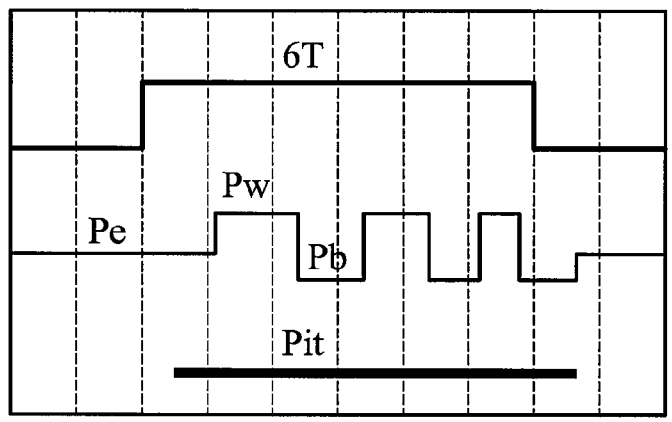
Figure 2:
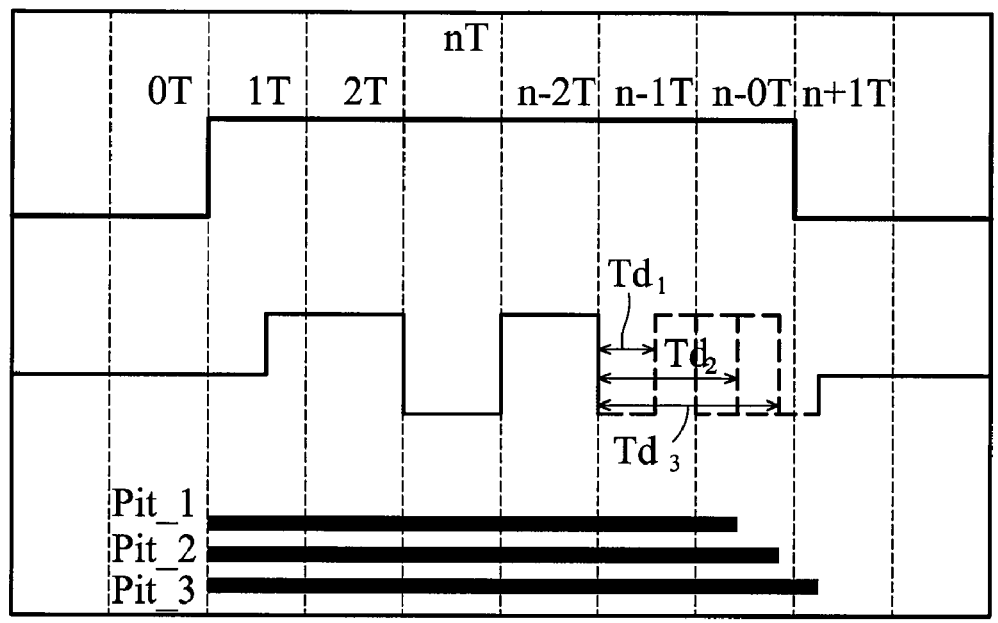
FIG. 2 and FIG. 3 are schematic diagrams of dynamic adjustment of a back-end pulse interval and pulse ratios, respectively.
Figure 3:
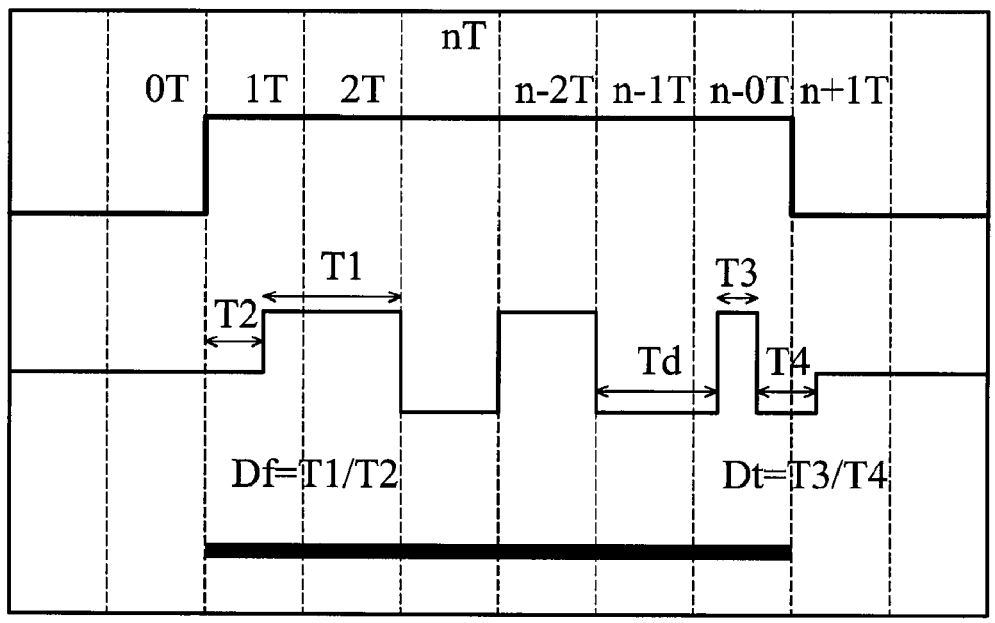

A detailed description of the invention is provided in the following. Please refer to FIG. 2 and FIG. 3 at the same time. FIG. 2 and FIG. 3 are schematic diagrams of dynamic adjustment of a back-end pulse interval $T_d$ and front-end pulse ratio $D_f$ ($D_f=T_1/T_2$) and back-end pulse ratio $D_b$ ($D_b=T_3/T_4$), respectively. Initially, the back-end pulse interval $T_d$ is adjusted first to record a pit of a precise length. For example, if the ideal pit length is 6T, the recorded pit on the disc will be exactly equal to 6T. The front-end and back-end pulse ratio $D_f$ and $D_b$ are then adjusted to generate precisely front-end and back-end positions of the recorded pit. In other words, the beginning and ending positions of an ideal pit are exactly equal to that of the recorded pit. Please note that the description of pit and its length is only meant to serve as an example, and is not meant to be taken as a limitation. In other words, various kinds of marks (e.g. land and its length for limiting the previous or following pit) can be applied in the invention. In the following description, it takes the pit and its length to be the example. A detailed description of adjusting these parameters is described in the following.

Please refer to FIG. 2 first. There are three different back-end pulse intervals $T_{d1}$, $T_{d2}$, $T_{d3}$ applied in the write strategy to record three corresponding pits Pit_1, Pit_2, Pit_3 in the disc. By reading and analyzing the radio frequency signals of pits Pit_1, Pit_2, and Pit_3, an optimal back-end pulse interval $T_d$ can be determined as the back-end pulse interval $T_{d3}$. Additionally, if the recorded pit length is equal to nT where n is a positive value, the adjusting range offset value $T_d$ is between (n−2)T and nT. Similarly, optimal front-end and back-end pulse ratio $D_f$ and $D_b$ shown in FIG. 3 are finally determined from recording pits with different optimal pulse ratio values, reading back corresponding RF signals of these pits, and finding one with a least jitter value. A detailed description of write strategy parameter variation under different transfer rates is described in the following.

Figure 4:
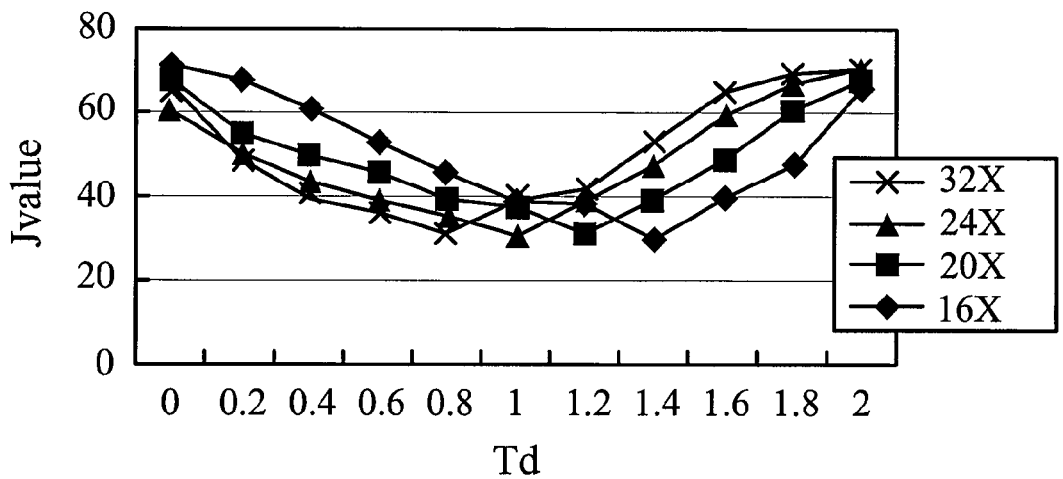
FIG. 4 shows the relationship of jitter value with back-end pulse interval.
Figure 5:
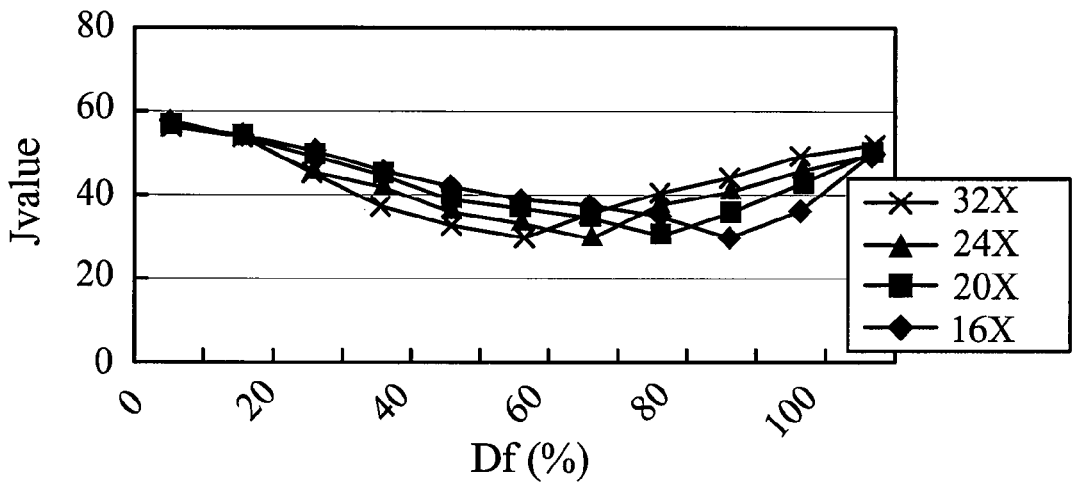
FIG. 5 shows the relationship of jitter value with front-end pulse ratio.
Figure 6:
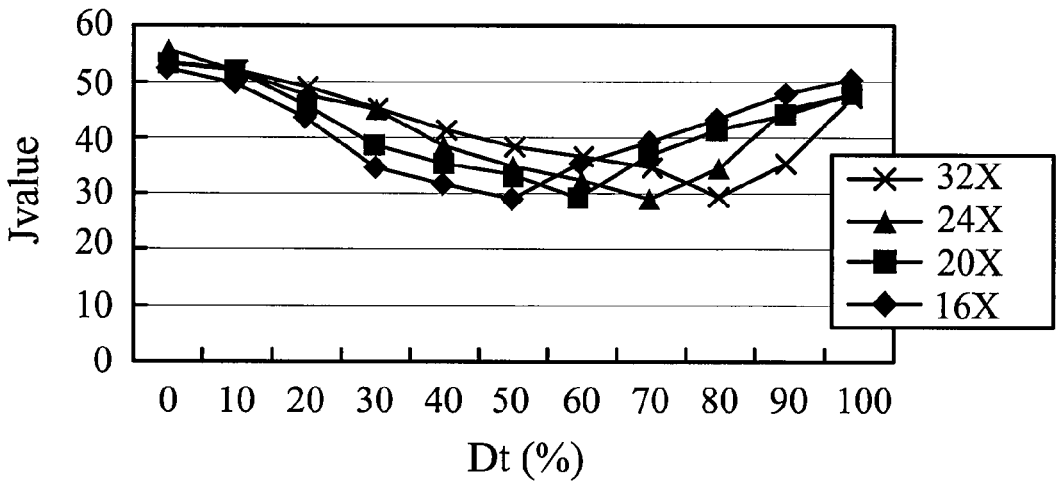
FIG. 6 shows the relationship of jitter value with back-end pulse ratio.

Please refer to FIG. 4, FIG. 5, and FIG. 6 at the same time. FIG. 4, FIG. 5, and FIG. 6 show the relationship of jitter value $J_{value}$ with back-end pulse interval $T_d$, front-end pulse ratio $D_f$ and back-end pulse ratio $D_b$, respectively. FIG. 4 shows that the back-end pulse interval $T_d$ is reduced to minimize the jitter value $J_{value}$ when the transfer rate (e.g. 16x, 20x, 24x, 32x) increases. The back-end pulse interval $T_d$ can be shortened to obtain the minimal jitter value $J_{value}$ since the diffusion effect of the recorded pit is significant when the transfer rate increases. Similarly, FIG. 5 shows that the front-end pulse ratio $D_f$ is reduced to minimize the jitter value $J_{value}$ when the transfer rate increases. Finally, FIG. 6 shows that the back-end pulse ratio $D_b$ is increased to minimize the jitter value $J_{value}$ when the transfer rate increases.

Figure 7:
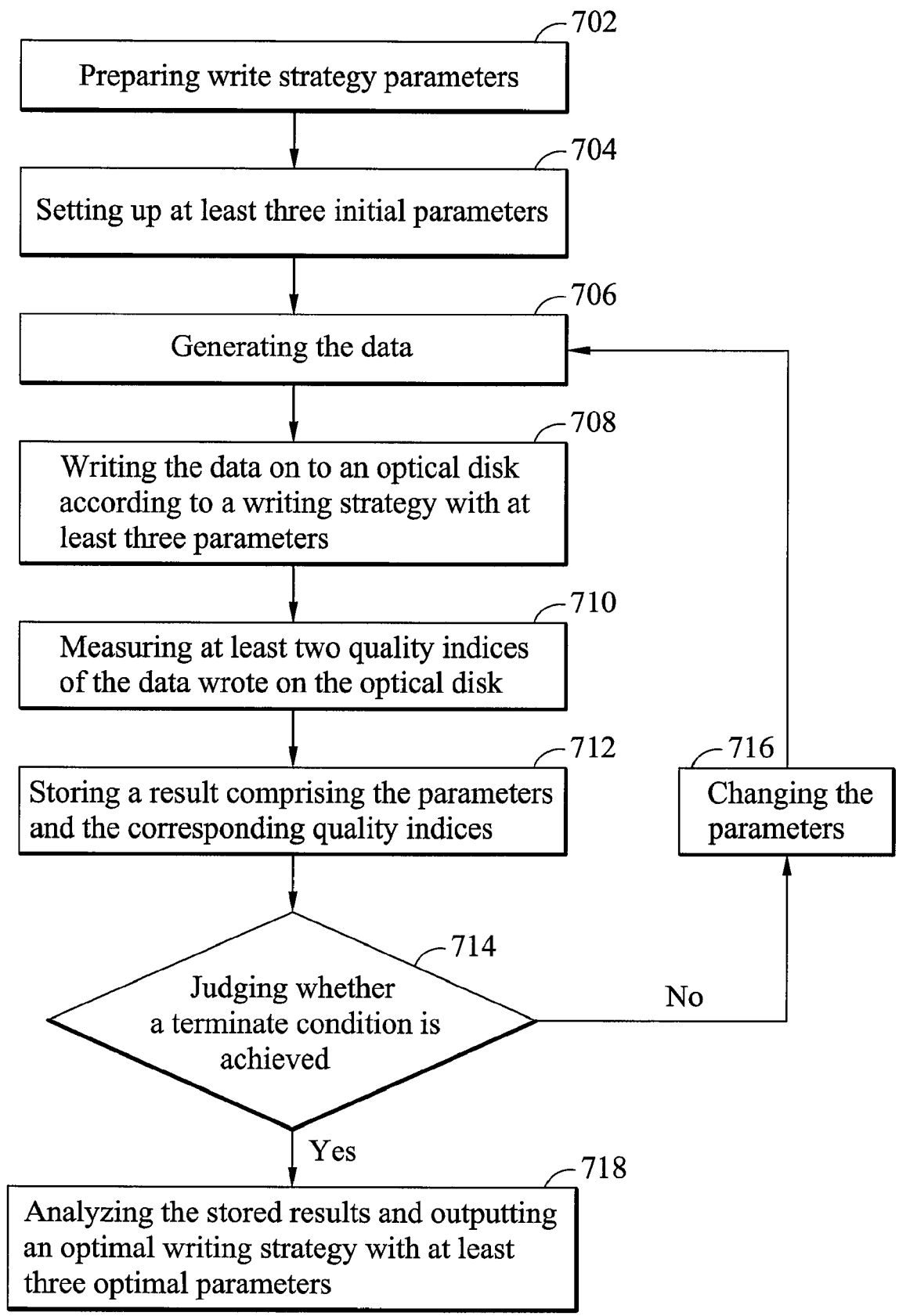
FIG. 7 is a flow chart of the dynamic write strategy modification method according to an embodiment of the invention.

Please refer to FIG. 7. FIG. 7 is a flow chart of the dynamic write strategy modification method according to an embodiment of the invention. A detailed description is given in the following.

Step 702: Preparing write strategy parameters. The write strategy parameters comprise a plurality of different back-end pulse intervals $T_{d1}$~$T_{dn}$, different front-end pulse ratio $D_{f1} \sim D_{fn}$, different back-end pulse ratio $D_{b1} \sim D_{bn}$ in an adjustable range.

Step 704: Setting up an initial back-end pulse interval $T_{d\_init}$, an initial front-end pulse ratio $D_{f\_init}$, and an initial back-end pulse ratio $D_{b\_init}$.

Step 706: Generating the test data.

Step 708: Recording the test data onto a disc by utilizing the initial back-end pulse interval $T_{d\_init}$, the initial front-end pulse ratio $D_{f\_init}$, and the initial back-end pulse ratio $D_{b\_init}$ of write strategy.

Step 710: Measuring a pit length and jitter value of the test data.

Step 712: Storing jitter value information, a current back-end pulse interval, a current front-end pulse ratio, and a current back-end pulse ratio.

Step 714: Determining whether to stop recording the test data by utilizing different write strategy parameters. If yes (satisfying a terminate condition), proceed to step 718; otherwise proceed to step 716.

Step 716: Selecting another back-end pulse interval to replace the current back-end pulse interval, selecting another front-end pulse ratio to replace the current front-end pulse ratio, and selecting another back-end pulse ratio to replace the current back-end pulse ratio.

Step 718: Finding an optimal back-end pulse interval and optimal front-end and back-end pulse ratio and utilizing these optimal write strategy parameters to dynamically modify the write strategy.

Step 720: Recording data on a disc by utilizing the modified write strategy.

Figure 8:
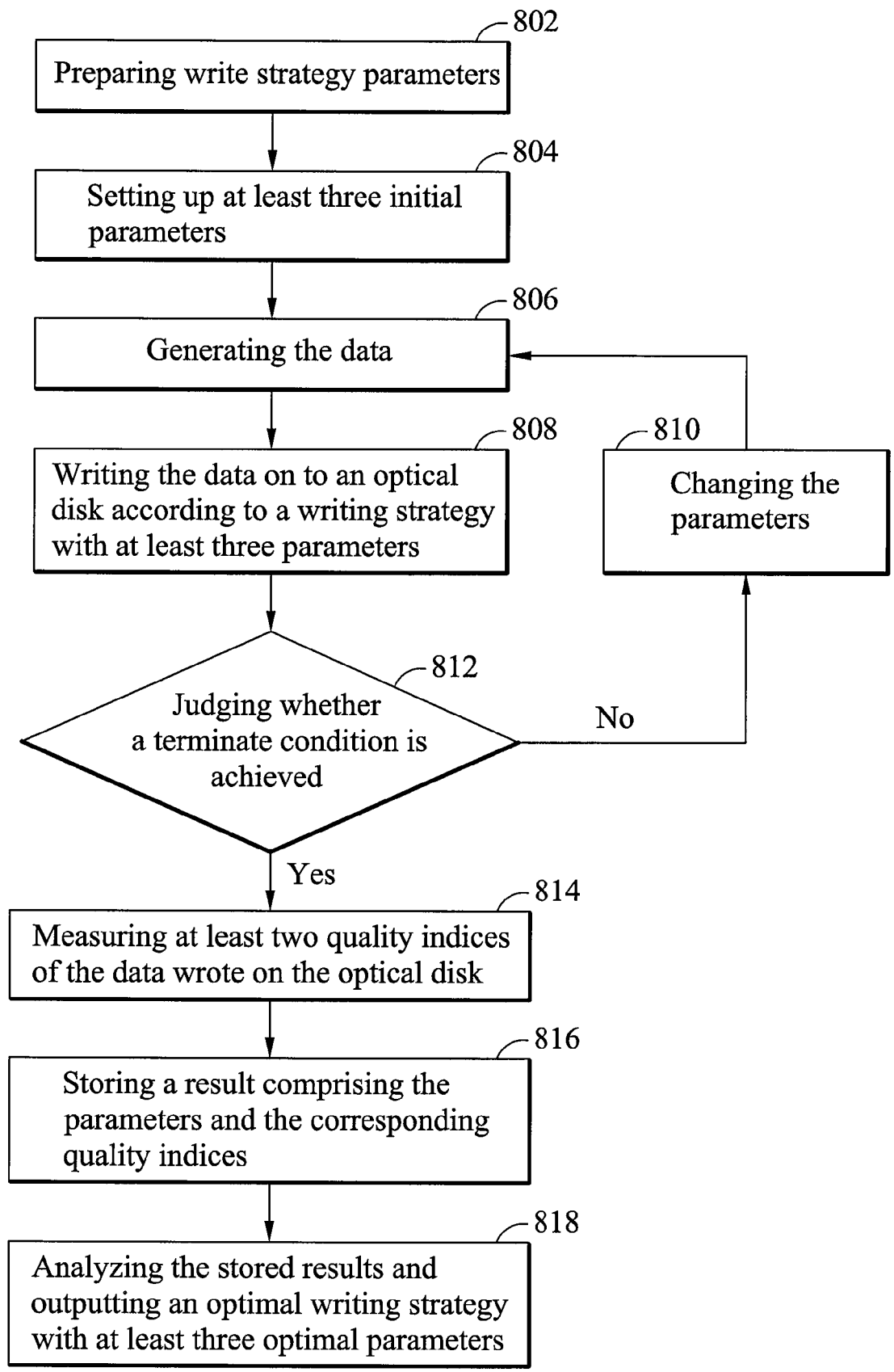
FIG. 8 is a flow chart of the dynamic write strategy modification method according to another embodiment of the invention.

Please refer to FIG. 8. FIG. 8 is a flow chart of the dynamic write strategy modification method according to another embodiment of the invention. A detailed description is given in the following.

Step 802: Preparing write strategy parameters. The write strategy parameters comprise a plurality of different back-end pulse intervals $T_{d1} \sim T_{dn}$, different front-end pulse ratio $D_{f1} \sim D_{fn}$, different back-end pulse ratio $D_{b1} \sim D_{bn}$ in an adjustable range.

Step 804: Setting up an initial back-end pulse interval $T_{d\_init}$, an initial front-end pulse ratio $D_{f\_initial}$, and an initial back-end pulse ratio $D_{b\_initial}$.

Step 806: Generating the test data.

Step 808: Recording the test data onto a disc by utilizing the initial back-end pulse interval $T_{d\_init}$, the initial front-end pulse ratio $D_{f\_initial}$, and the initial back-end pulse ratio $D_{b\_initial}$ of the write strategy.

Step 810: Selecting another back-end pulse interval to replace the current back-end pulse interval, selecting another front-end pulse ratio to replace the current front-end pulse ratio, and selecting another back-end pulse ratio to replace the current back-end pulse ratio.

Step 812: Determining whether to stop recording the test data by utilizing different write strategy parameters. If yes (satisfying a terminate condition), proceed to step 814; otherwise proceed to step 810.

Step 814: Measuring a pit length and jitter value of the test data.

Step 816: Storing jitter value information, a current back-end pulse interval, a current front-end pulse ratio, and a current back-end pulse ratio.

Step 818: Finding an optimal back-end pulse interval, an optimal front-end pulse ratio, and an optimal back-end pulse ratio and utilizing these optimal write strategy parameters to dynamically modify the write strategy.

Step 820: Recording data on a disc by utilizing the modified write strategy.

Please note that the kind of terminate condition (in steps 714 and 812) is not limited in the invention. Various kinds of terminate conditions can be applied in the invention. For example, the quality of the recorded test data, the distribution of the jitter value, or the number of write strategy parameter can be taken as the terminate condition. In the case of the recorded test data quality, if the quality is good enough (the jitter value of the test data is small enough), the terminate condition is satisfied. In the case of jitter value distribution, when the jitter value becomes divergent, the terminate condition is satisfied. In the case of parameter number, if each parameter is utilized to write the test data, the terminate condition is satisfied.

Figure 9:
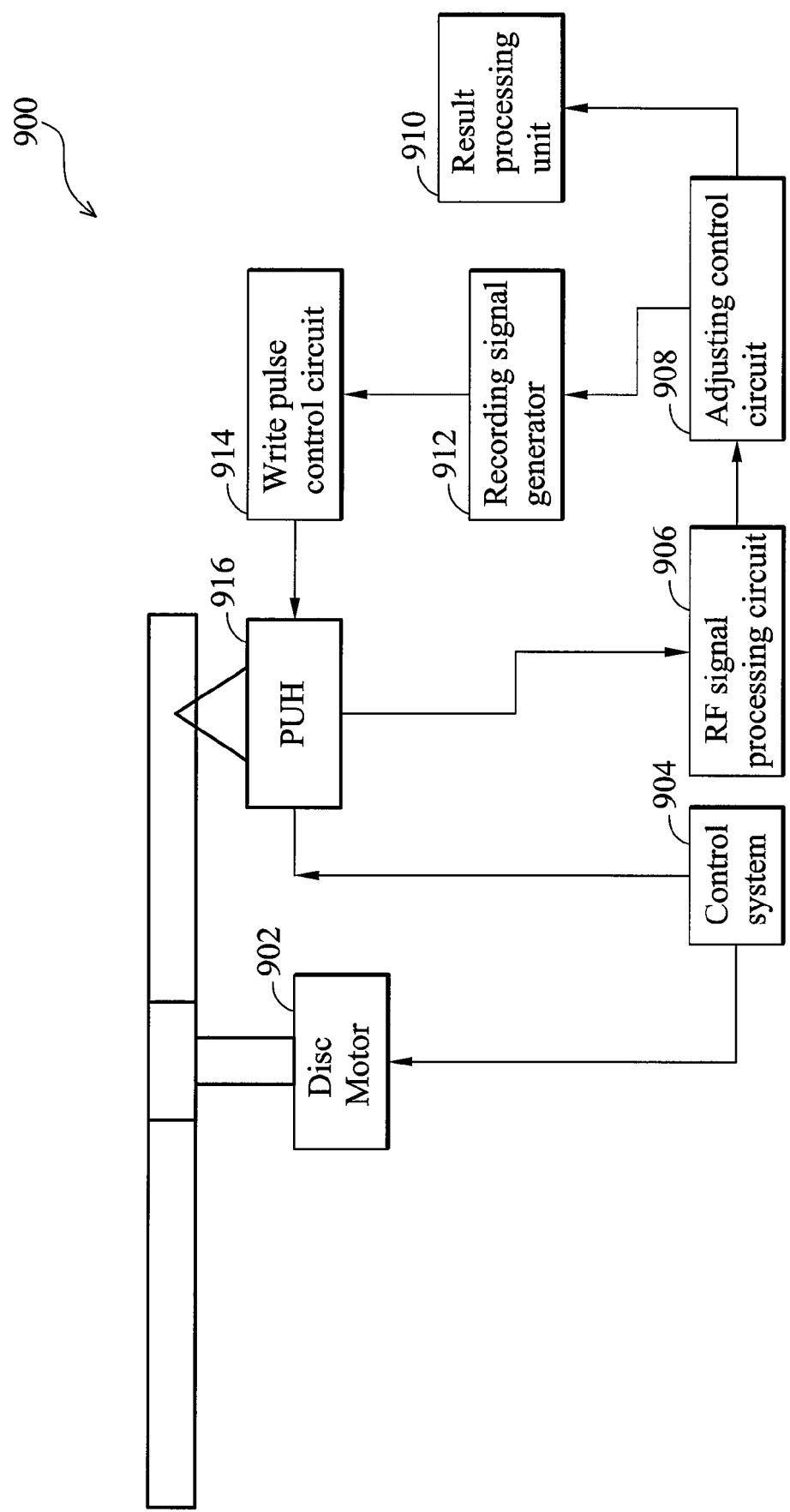
FIG. 9 is a block diagram of an optical disc writing system according to an embodiment of the invention.

Please refer to FIG. 9. FIG. 9 is a block diagram of an optical disc writing system 900 according to an embodiment of the invention. The optical disc writing system 900 comprises a disc motor 902, a control system 904, an RF signal processing circuit 906, an adjusting control circuit 908, a result processing unit 910, a recording signal generator 912, a write pulse control circuit 914, and a pick-up head (PUH) 916. The recording signal generator 912 prepares the recording signal according to the data to be recorded on the disc and a write strategy corresponding to the data. The write pulse control circuit 914 control the PUH according to the received recording signal. The PUH 916 emits laser onto the optical disc under control of the write pulse control circuit 914. The disc motor 902 is utilized to rotate the disc to let the PUH 916 emit laser on the whole optical disk. The rotating speed of the disc is controlled by the control system 904. Additionally, the control system 904 also controls output laser power of the PUH 916.

The PUH 916 receives the reflected light from the optical disc and generates derived signal by detecting the reflected light. The RF signal processing circuit 906 processing the derived signal and measures the writing quality indices (e.g. jitter value and pit length) according to the derived signal. The adjusting control circuit 908 receives quality indices, and stores the current write strategy parameter (e.g. back-end pulse interval $T_d$ and/or front-end pulse ratio $D_f$ and $D_b$) and the quality indices (e.g. jitter value and pit length). Then the adjusting control circuit 908 chooses another write strategy parameter to update the current write strategy parameter in the recording signal generator 912 until a terminate condition is achieved. The result processing unit 910 receives the results (the write strategy parameters (e.g. back-end pulse interval $T_d$ and/or front-end pulse ratio $D_f$ and $D_b$) and the corresponding quality indices) from the adjusting control circuit 908, analyzes the stored results, and outputs an optimal writing strategy with optimal parameters according to the analyzing. Finally, the write pulse control circuit 914 generates write pulse according to the current write strategy parameter.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dynamic write strategy modification method comprising:

writing a plurality of data on to an optical disk according to a writing strategy with at least three parameters;

measuring at least two quality indices of the data wrote on the optical disk;

storing a result comprising the parameters and the corresponding quality indices;

judging whether a terminate condition is achieved;

if no, changing the parameters and repeating the above steps; and if yes, analyzing the stored results and outputting an optimal writing strategy with at least three optimal parameters.

2. The dynamic write strategy modification method of claim 1, wherein the parameter is selected from the group comprised a back-end pulse interval, a front-end pulse ratio, and a back-end pulse ratio.

3. The dynamic write strategy modification method of claim 2, wherein quality indices are selected form the group comprised a jitter value and a mark length corresponding to a specific wrote data.

4. The dynamic write strategy modification method of claim 3, wherein the back-end pulse interval is reduced to minimize the jitter value when a transfer rate increases.

5. The dynamic write strategy modification method of claim 3, wherein the front-end pulse ratio is reduced to minimize the jitter value when a transfer rate increases.

6. The dynamic write strategy modification method of claim 3, wherein the back-end pulse ratio is increased to minimize the jitter value when a transfer rate increases.

7. The dynamic write strategy modification method of claim 1, wherein the step of analyzing the stored results further comprises choosing a back-end pulse interval corresponding to an accurate mark length as one of the optimal parameters.

8. The dynamic write strategy modification method of claim 1, wherein the step of analyzing the stored results further comprises choosing a front-end pulse ratio corresponding to a minimum jitter value as one of the optimal parameters.

9. The dynamic write strategy modification method of claim 1, wherein the step of analyzing the stored results further comprises choosing a back-end pulse ratio corresponding to a minimum jitter value as one of the optimal parameters.

10. The dynamic write strategy modification method of claim 1, wherein the terminate condition is selected from the group comprised:

(a) the quality indices are qualified;

(b) the quality indices are divergent; and (c) the write strategy is a last write strategy for writing the data.

11. A dynamic write strategy modification apparatus comprising:

a pick-up head (PUH) for writing a plurality of data on to an optical disk according to a writing strategy with at least three parameters;

an RF signal processing circuit for measuring at least two quality indices of the data wrote on the optical disk;

an adjusting control circuit for storing a result comprising the parameters and the corresponding quality indices;

judging whether a terminate condition is achieved;

if no, changing the parameters to generating a next write strategy and transmitting the next write strategy to the PUH; and if yes, sending the results; and a result processing unit for receiving the results from the adjusting control circuit;

analyzing the stored results; and outputting an optimal writing strategy with at least three optimal parameters according to the analyzing.

12. The dynamic write strategy modification apparatus of claim 11 further comprising:

a recording signal generator for receiving the data will be recorded on the disc and preparing recording signal according to the data and the write strategy.

13. The dynamic write strategy modification apparatus of claim 11, wherein the parameter is selected from the group comprised a back-end pulse interval, a front-end pulse ratio, and a back-end pulse ratio.

14. The dynamic write strategy modification apparatus of claim 11, wherein quality indices are selected form the group comprised a jitter value and a mark length corresponding to a specific wrote data.

15. The dynamic write strategy modification method of claim 14, wherein the back-end pulse interval is reduced to minimize the jitter value when a transfer rate increases.

16. The dynamic write strategy modification method of claim 14, wherein the front-end pulse ratio is reduced to minimize the jitter value when a transfer rate increases.

17. The dynamic write strategy modification method of claim 14, wherein the back-end pulse ratio is increased to minimize the jitter value when a transfer rate increases.

18. The dynamic write strategy modification apparatus of claim 11, wherein a back-end pulse interval corresponding to an accurate mark length is one of the optimal parameters.

19. The dynamic write strategy modification apparatus of claim 11, wherein a front-end pulse ratio corresponding to a minimum jitter value is one of the optimal parameters.

20. The dynamic write strategy modification apparatus of claim 11, wherein the step of analyzing the stored results further comprises choosing a back-end pulse ratio corresponding to a minimum jitter value as one of the optimal parameters.

21. The dynamic write strategy modification apparatus of claim 11, wherein the terminate condition is selected from the group comprised:

(a) the quality indices are qualified;

(b) the quality indices are divergent; and (c) the write strategy is a last write strategy for writing the data.

* * * * *